United States Patent
Caillard

(10) Patent No.: US 12,546,238 B2
(45) Date of Patent: Feb. 10, 2026

(54) THERMAL POWER PLANT

(71) Applicant: Frédéric Caillard, Strasbourg (FR)

(72) Inventor: Frédéric Caillard, Strasbourg (FR)

( * ) Notice: Subject to any disclaimer, the term of this patent is extended or adjusted under 35 U.S.C. 154(b) by 168 days.

(21) Appl. No.: 18/558,916

(22) PCT Filed: May 3, 2022

(86) PCT No.: PCT/EP2022/061853
§ 371 (c)(1),
(2) Date: Nov. 10, 2023

(87) PCT Pub. No.: WO2022/233874
PCT Pub. Date: Nov. 10, 2022

(65) Prior Publication Data
US 2024/0218813 A1    Jul. 4, 2024

(30) Foreign Application Priority Data

May 5, 2021  (FR) ..................................... 2104749

(51) Int. Cl.
| | | |
|---|---|---|
| *F01K 23/10* | (2006.01) | |
| *F01K 11/02* | (2006.01) | |
| *F01K 13/02* | (2006.01) | |

(52) U.S. Cl.
CPC .............. F01K 23/10 (2013.01); F01K 11/02 (2013.01); F01K 13/02 (2013.01)

(58) Field of Classification Search
CPC ........... F01K 23/10; F01K 11/02; F01K 13/02
See application file for complete search history.

(56) References Cited

U.S. PATENT DOCUMENTS

| | | | | |
|---|---|---|---|---|
| 3,977,196 A | * | 8/1976 | Sedille .................... | F01K 23/04 165/110 |
| 4,387,574 A | * | 6/1983 | Becker .................... | F03G 6/065 126/584 |
| 4,619,809 A | | 10/1986 | Schluderberg | |
| 6,065,280 A | * | 5/2000 | Ranasinghe ............ | F01K 23/10 60/39.181 |

(Continued)

FOREIGN PATENT DOCUMENTS

| | | | |
|---|---|---|---|
| FR | 1093680 A | | 5/1955 |
| FR | 2116671 A5 | * | 7/1972 |

OTHER PUBLICATIONS

English Translation FR2116671A5 (Year: 1972).*

(Continued)

*Primary Examiner* — Shafiq Mian
(74) *Attorney, Agent, or Firm* — LEASON ELLIS LLP

(57) ABSTRACT

A thermal power plant for producing electricity or motive power includes at least one fuel or heat recovery boiler, a turbine, a main circuit for circulating a working fluid, a drum located in the boiler on the main circuit, a reheating module, and a secondary circuit in which a reheating fluid circulates. The reheating module includes a downstream heat exchanger, and the secondary circuit includes an upstream heat exchanger enabling heat to be transferred from combustion fumes or recovery fluid to the reheating fluid circulating in the secondary circuit, with the reheating fluid circulating in the secondary circuit between the upstream and downstream heat exchangers. A process produces electricity in the thermal power plant.

16 Claims, 1 Drawing Sheet

(56) References Cited

U.S. PATENT DOCUMENTS

2010/0024382 A1    2/2010  Zhang et al.
2010/0162700 A1*   7/2010  Birnbaum ............... F22B 1/006
                                                      60/641.8

OTHER PUBLICATIONS

International Search Report and English translation for corresponding International application No. PCT/EP2022/061853, dated Sep. 12, 2022.

* cited by examiner

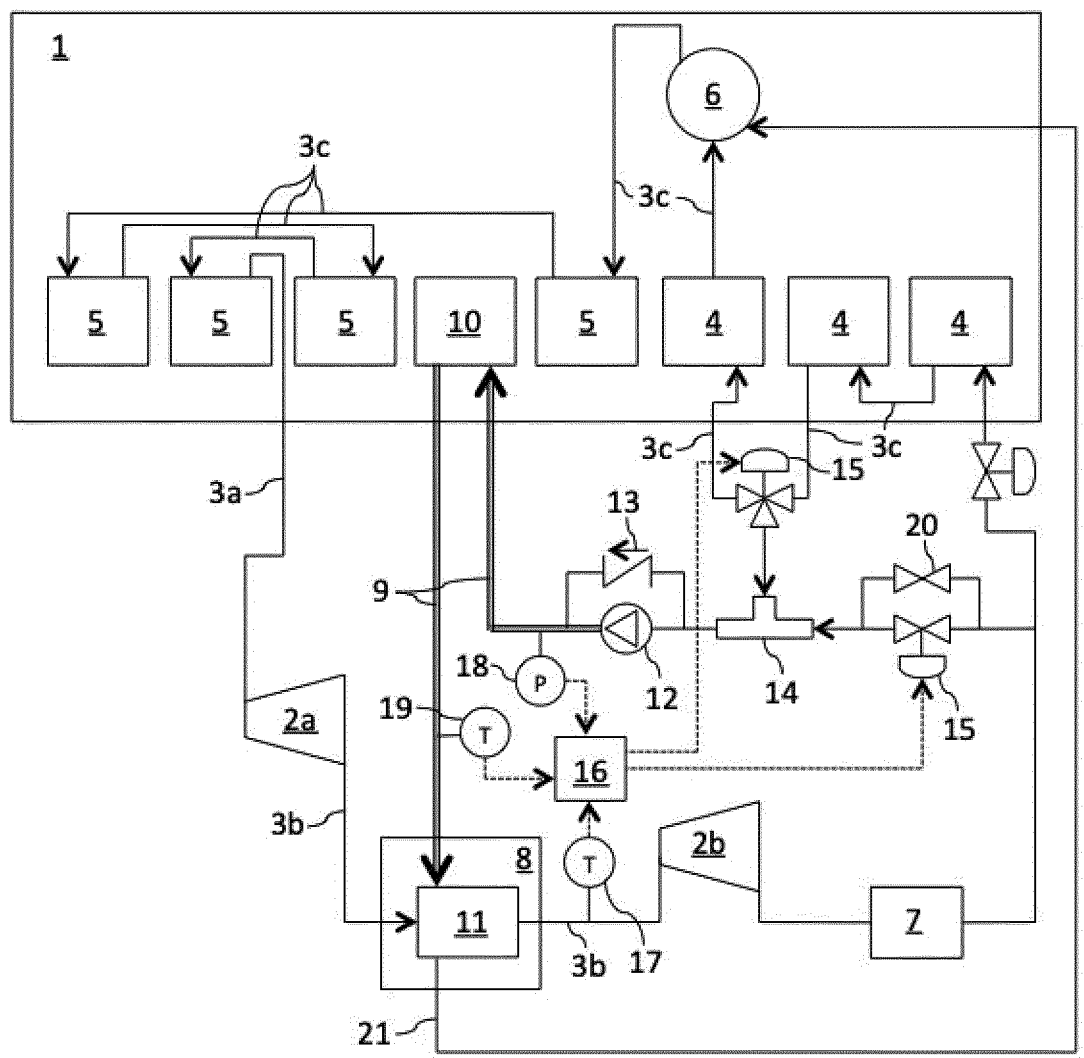

THERMAL POWER PLANT

CROSS-REFERENCE TO RELATED PATENT APPLICATIONS

This application is a U.S. National Stage Application under 35 U.S.C. § 371 of International Patent Application No. PCT/EP2022/061853 filed May 3, 2022, which claims the benefit of priority of French Patent Application number 2104749 filed May 5, 2021, both of which are incorporated by reference in their entireties. The International Application was published on Nov. 10, 2022, as International Publication No. WO/2022/233874.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A READ-ONLY OPTICAL DISC, AS A TEXT FILE OR AN XML FILE VIA THE PATENT ELECTRONIC SYSTEM

Not Applicable

STATEMENT REGARDING PRIOR DISCLOSURES BY THE INVENTOR OR A JOINT INVENTOR

Not Applicable

BACKGROUND OF THE INVENTION

1. Field of the Invention

The present invention relates to the field of power generation. More particularly, it relates to a thermal power plant for producing electricity or motive power.

2. Description of Related Art Including Information Disclosed Under 37 CFR 1.97 and 1.98

A thermal power plant usually comprises one or more boilers in which fuels are burned and/or one or more recovery boilers. The heat generated in the boiler(s) is used to heat a working fluid, which is then fed to at least one turbine to set it in motion. The movement of the turbine produces motive power or enables an alternator to generate electricity. In the particular case of a waste incineration plant, the working fluid is usually fed into the boiler(s) at a pressure level of between 20 and 85 bar.

In order to increase the efficiency of thermal power plants, they can operate according to a Rankine cycle with reheating. In this case, the turbine(s) has/have at least two sections, and at least one reheating module is used to heat the working fluid between two turbine sections. To this end, the reheating module can be of various designs. In the most common case (internal reheating), it is located at least partly in the boiler and reheats the working fluid in contact—for example—with the combustion fumes. In other cases, it may be external to the boiler and fed by various heat sources, from external processes for example, or from the working fluid itself. For example, in the case of waste incineration power plants, there has been sought to use a working fluid with a high-pressure level, for example in excess of 70 bar, combined with an external reheater. In the case of thermal power plants using other types of fuel or recovered heat, the use of reheating cycles is also very frequently coupled with high working fluid pressure levels. Efficiency is thus improved, but there are a number of drawbacks to managing this pressure level, particularly where waste fuels are concerned:

the investment cost of a high-pressure boiler and working fluid circuit is higher than for a conventional pressure level, a high-pressure boiler has a higher waterwalls temperature, resulting in faster refractory degradation and a higher rate of first-pass tube wear. More maintenance is therefore required, and the rate of unscheduled boiler downtime is higher than for a conventional pressure level.

the turbine downtime rate is higher than in a power plant without reheating, as the turbine is often unable to operate when the reheating stage is unavailable, due to the high condensation rate in the turbine's low-pressure stages in the absence of reheating. The main causes of unavailability of the reheating stage are failure of any reheating pumps and leakage from a reheating exchanger. For power plants with internal reheating, a leak from a reheating exchanger can also lead to unplanned boiler downtime.

In the end, the gain in electrical efficiency is partly offset by these additional costs and by the reduction in electrical output caused by the extra downtime.

In the case of a thermal power plant where part of the fuel is waste, or a waste-to-energy (WtE) plant, these problems are even greater because the fumes are corrosive, which already poses problems of boiler wear at conventional pressure levels.

One object of the present invention is to provide a thermal power plant with improved efficiency while reducing manufacturing and operating costs.

Another object of the present invention is to offer a thermal power plant compatible with waste combustion with improved efficiency.

BRIEF SUMMARY OF THE INVENTION

The purpose of the present invention is to meet at least part of the above-mentioned objectives by proposing a thermal power plant comprising, in addition to the conventional main circuit for the working fluid driving a turbine, a second so-called secondary circuit in which a reheating fluid circulates, the reheating fluid being heated in the boiler and then used to reheat the working fluid. To this end, it proposes a thermal power plant for producing electricity or motive power comprising at least one fuel or heat recovery boiler, at least one turbine, at least one main circuit for circulating a working fluid, at least one drum located in the boiler on said main circuit, at least one reheating module and at least one secondary circuit in which a reheating fluid circulates, wherein:

said main circuit comprises at least one initial stretch located in said at least one boiler, at least one first stretch for sending working fluid from said at least one boiler to a first set of at least one turbine section, and a second stretch for sending working fluid from said first set of at least one turbine section to a second set of at least one turbine section, said working fluid in said drum being at nominal load point at a main pressure level, and said reheating module comprises at least one downstream heat exchanger located on the second stretch of the main circuit.

This plant is particular in that said secondary circuit comprises at least one upstream heat exchanger located in said boiler, said reheating fluid circulating in said secondary circuit between the upstream and downstream heat exchangers, said reheating fluid leaving the upstream heat exchanger at the nominal load point at a secondary pressure level, and said secondary pressure level being at least ten bars higher than said main pressure level.

Thanks to these arrangements, the working fluid can be reheated without having to be itself at a high-pressure level in the boiler, thus reducing the number of plant components in which a high-pressure fluid circulates. This makes it possible to use more elements such as economizers, balloons, superheaters, evaporators and other evaporative exchange surfaces (walls, etc.) that are not compatible with a high-pressure level, and therefore less expensive, and to reduce wear due to temperatures associated with high pressure levels in these plant elements.

According to further features:

said fuels may comprise waste such as household waste, waste from economic activities, hazardous waste, biomass, sewage sludge, or medical waste, said primary pressure level being between 20 and 85 bar, and said secondary pressure level being greater than 70 bar, this type of plant being particularly suited to the invention, as corrosive fumes do not usually allow internal reheating fed by boiler fumes under satisfactory conditions, the upstream heat exchanger can be a convective type exchanger, which allows it to be placed in the convective passage of the boiler and thus be exposed to temperatures lower than those of the furnace and the radiative passages of the boiler, with the advantage of being able to use less expensive materials and reduce wear caused by exposure to high temperatures, said thermal power plant can be configured so that at least 90% of the mass of reheating fluid leaving the upstream heat exchanger is sent to the downstream exchanger, thus ensuring good reheating efficiency, said thermal power plant can be configured so that the entire mass of reheating fluid leaving the upstream heat exchanger is sent to the downstream exchanger, thereby maximizing reheating efficiency, the reheating fluid circulating in said secondary circuit between the upstream heat exchanger and the downstream exchanger can be in the liquid state, thus avoiding phase changes in the secondary circuit, and in particular avoiding the installation of a second boiler drum on the secondary circuit, which would make the plant costlier and more complex to operate, said boiler may comprise a fumes circuit, and said upstream heat exchanger may be located in said fumes circuit of said boiler, this being a simple and efficient embodiment of the invention, said secondary circuit may comprise at least one pump for achieving the secondary pressure level, which is a simple and robust embodiment of the invention, said secondary circuit can be supplied with reheating fluid from at least two separate sources, the pressure and/or temperature level of the two sources being different, thereby effectively regulating the flow rate and/or temperature of the reheating fluid, and thus the temperature of the reheated working fluid, said thermal power plant may further comprises:

a first temperature sensor on the second stretch of the main circuit, downstream of said downstream heat exchanger, a pressure sensor, located on said secondary circuit, a second temperature sensor, located on said secondary circuit between said upstream heat exchanger and said downstream heat exchanger, and a control system connected to the first and second temperature and pressure sensors, and to at least one valve for controlling the flow rate of a source of secondary circuit reheating fluid or the flow rate of the partial or total bypass of the upstream heat exchanger, which is a simple and effective way of regulating the temperature of the reheated working fluid, while avoiding reaching the boiling point of the reheating fluid if it is liquid.

said thermal power plant may comprise at least one economizer located on the initial stretch of the main circuit, at least part of the secondary circuit's reheating fluid supply coming from an outlet of said economizer and/or from a condensate and feedwater circuit, which are easily accessible sources allowing a diversity of sources for the secondary circuit, said reheating fluid can be sent after said downstream heat exchanger, to a drum located in said boiler and/or to a condensate and feedwater circuit, which allows the reheating fluid to be pressurized, and the calories it carries to be recovered in the operation of the power plant.

The present invention also relates to a process for producing electricity or motive power in a thermal power plant according to the invention, comprising the following steps:

fuel combustion or heat recovery in at least one boiler, in said boiler, enthalpy rise of a working fluid in a main circuit, and enthalpy rise of a reheating fluid in a secondary circuit, from the energy contained in combustion fumes and recovery fluid.

delivery of said working fluid to at least a first set of at least one turbine section, sending said working fluid from said first set of at least one turbine section to at least one downstream heat exchanger of a reheating module, and sending said reheating fluid from the upstream heat exchanger to said downstream heat exchanger, heat transfer from said reheating fluid to said working fluid in said downstream heat exchanger, sending said working fluid from said downstream heat exchanger to a second set of at least one turbine section.

Thanks to these arrangements, the working fluid can be reheated without having to be itself at a high-pressure level in the boiler, thus reducing the number of plant components in which a high-pressure fluid circulates. This makes it possible to use more elements such as economizers, balloons, superheaters, evaporators and other evaporative exchange surfaces (walls, etc.) that are not compatible with high pressure, and therefore less expensive, and to reduce wear due to temperatures associated with high pressure in these plant elements.

According to further features:

at least 90% of the mass of reheating fluid leaving the upstream heat exchanger can be sent to the downstream exchanger, thus ensuring good reheating efficiency.

the entire mass of reheating fluid leaving the upstream heat exchanger can be sent to the downstream exchanger, thus maximizing reheating efficiency.

BRIEF DESCRIPTION OF THE SEVERAL VIEWS OF THE DRAWING(S)

The present invention will be better understood on reading the detailed description that follows, with reference to the appended FIGURES in which:

FIG. 1 is an operating diagram of a thermal power plant according to a preferred embodiment of the invention.

DETAILED DESCRIPTION OF THE INVENTION

The thermal power plant shown in a preferred embodiment in FIG. 1 enables electricity or motive power to be generated from the combustion of fuels or waste heat in at least one boiler 1. The thermal power plant according to the invention is therefore not a nuclear power plant, since nuclear energy does not give rise to a combustion reaction, and the steam generators of nuclear power plants do not fall into the category of heat recovery boilers.

Fuels can include fossil fuels such as coal, natural gas or fuel oil. They may also include biomass, biogas or syngas. In a preferred embodiment of the invention, the fuels comprise waste such as household waste, waste from economic activities, hazardous waste, biomass, sewage sludge or medical waste. The power plant has at least one turbine, comprising at least two sets of at least one turbine section 2a, 2b, and a main circuit for supplying enthalpy to a working fluid in the boiler 1 and circulating the working fluid from the boiler 1 to the turbine. The working fluid is water, for example, which may be in liquid form at some stages, and in steam form at others. The turbine converts thermal energy from the boiler 1, via the working fluid, into motion. This motion can then be recovered by an alternator to generate electricity or be used as motive power.

Downstream of boiler 1, the main circuit comprises at least two stretches, including a first stretch 3a for sending working fluid from boiler 1 to the first set of at least one turbine section 2a, and at least one second stretch 3b for sending working fluid from the first set of at least one turbine section 2a to the second set of at least one turbine section 2b. A particular embodiment of the invention will be described below using the example of a single first stretch 3a and a single second stretch 3b, but the invention can be implemented without difficulty in a similar way with several first stretches 3a and several second stretches 3b, for example in the case of multi-stage reheating cycles, or parallel stretches due to the number of turbines or the number of reheating modules 8 in the thermal power plant.

Upstream of the first stretch 3a, the main circuit includes an initial stretch 3c located in the boiler, enabling the enthalpy of the working fluid to rise. The initial stretch 3c comprises a drum 6, or possibly several drums 6, to separate the phases of the working fluid. The initial stretch 3c may comprise one or more economizers 4, to heat the working fluid when it is in a liquid state and/or one or more evaporator surfaces, to change the working fluid from a liquid state to a gaseous state and/or one or more superheaters 5, to heat the working fluid when it is in a gaseous state. A balloon 6 can be arranged, for example, between an economizer 4 and a superheater 5.

In the configuration shown in FIG. 1, the initial stretch 3c comprises three economizers 4, four superheaters 5, a drum 6 and evaporator surfaces (not shown) connected to the drum.

The working fluid in the drum 6, at the nominal load point, is at the main pressure level, for example between 20 and 85 bar in the case of waste incineration. In the second stretch 3b, after having transferred part of its energy to the first set of at least one turbine section 2a, the working fluid is at a so-called intermediate pressure level, lower than the main pressure level. In the case of a waste incineration power plant without a reheater, the working fluid is typically at a temperature of between 320 and 480° C. in the first stretch 3a, the temperature of the working fluid in the first stretch 3a being higher than in the second stretch 3b.

After entering the first set of at least one turbine section 2a, respectively the second set of at least one turbine section 2b, the working fluid drops in temperature and/or pressure, setting in motion the first set of at least one turbine section 2a, respectively the second set of at least one turbine section 2b.

On leaving the first set of at least one turbine section 2a, all the working fluid can be returned to the second stretch 3b of the main circuit. Alternatively, only part of the working fluid can be returned to the second stretch 3b of the main circuit and another part can be drawn off to a condensate and feedwater circuit 7 or to other processes external or internal to the thermal power plant enabling the working fluid and, for example, the thermal energy it still contains to be reused. Part of the working fluid may also be drawn off within the first and second sets of at least one turbine section 2a, 2b to the condensate and feedwater circuit 7 or to other external or internal processes. On leaving the second set of at least one turbine section 2b, all the working fluid can be directed to the condensate and feedwater circuit 7, which may comprise a working fluid condensation stage, or to other external or internal processes. On leaving the above-mentioned external or internal processes, the working fluid can be returned, for example, to a condensate and feedwater circuit 7.

The condensate and feedwater circuit 7 can then be used as a fluid source for the main circuit, for example by connecting it to the initial stretch 3c, and/or for the secondary circuit 9 described below.

The power plant also features at least one reheating module 8, for reheating the working fluid between two assemblies of at least one turbine section 2a, 2b.

The reheating module 8 is supplied with thermal energy by a secondary circuit 9, in which a reheating fluid circulates. The reheating fluid is distinct from the combustion fumes and the recovery fluid. The reheating fluid is, for example, water, which may be in liquid form at some stages, and in vapor form at others. In the embodiment shown in FIG. 1, the reheating fluid is in liquid form. The secondary circuit 9 is itself supplied with thermal energy by one or more upstream heat exchangers 10 located in the boiler 1. Thermal energy is therefore transferred from the boiler 1 to the reheating fluid circulating in the secondary circuit 9, via the upstream heat exchanger 10.

The upstream heat exchanger 10 can be of the convective type, i.e. more than 50% of the heat transferred within the upstream exchanger 10 is transferred by convection. This arrangement enables the upstream heat exchanger 10 to be located in a convective passage of the boiler, rather than in the furnace or in the radiative passages. As the temperatures to which the upstream heat exchanger 10 is exposed are lower in a convective passage than in the furnace or in a radiative passage, wear on the upstream heat exchanger 10 is reduced, and the upstream heat exchanger 10 can be designed with less expensive materials (alloys, refractory protection) than if it were located in the furnace or in the radiative passages.

The upstream heat exchanger 10 is located, for example, in contact with the fumes circuit of boiler 1, and the upstream heat exchanger 10 transfers heat from the combustion fumes and recovery fluid to the reheating fluid circulating in secondary circuit 9. The upstream heat exchanger 10 may, for example, be positioned between two superheaters 5, or at any other relevant location in the boiler.

The upstream heat exchanger 10 may comprise one or more elements located on the secondary circuit 9, in the boiler 1, including one or more economizers, to heat the reheating fluid when it is in the liquid state and/or one or more evaporator surfaces, to change the reheating fluid from a liquid state to a gaseous state and/or one or more superheaters, to heat the reheating fluid when it is in the gaseous state. The secondary circuit 9 in the boiler 1 may also include one or more drums for separating the phases of the reheating fluid when it changes to the gaseous state.

The reheating module 8 comprises one or more downstream heat exchangers 11, located in the second stretch 3*b* of the main circuit. In the downstream heat exchanger 11, thermal energy is transferred from the reheating fluid circulating in the secondary circuit 9 to the working fluid circulating in the second stretch 3*b* of the main circuit.

The reheating fluid therefore circulates between the upstream heat exchanger 10 and the downstream heat exchanger 11, in order to transfer thermal energy from the boiler to the working fluid circulating in at least one second stretch 3*b*, said second stretch 3*b* connecting a first set of at least one turbine sections 2*a* to a second set of at least one turbine sections 2*b*. At the outlet of the upstream heat exchanger 10, the reheating fluid is at a secondary pressure level, for example above 70 bar in the case of a waste incineration plant. The secondary pressure level is at least ten bars higher than the main pressure level. Such a pressure level differential is advantageous because it enables the temperatures required for reheating to be reached in the secondary circuit, while avoiding the need for high pressures in the main circuit.

To ensure efficient reheating, at least 90%, preferably all, of the mass of reheating fluid leaving the upstream heat exchanger 10 can be sent to the downstream exchanger 11. Indeed, the greater the quantity of reheating fluid leaving the upstream heat exchanger 10 sent to the downstream exchanger 11, the more efficient the reheating.

At the inlet of the reheating module 8, the working fluid is preferably in the form of steam. In some embodiments, it may be in biphasic form. In this case, it comprises a high percentage of steam and a low percentage of liquid, e.g. 98% and 2%, depending on the steam characteristics at the turbine inlet, the turbine efficiency and the reheating pressure level. The phases are then separated in the reheating module 8, and the liquid phase is discharged, typically to the condensate and feedwater circuit 7 or to other processes.

At the inlet to the downstream heat exchanger 11, the reheating fluid is preferably in liquid form. It can also be in gaseous form. In the latter case, the thermal power plant typically has a drum located in the boiler on the secondary circuit. In a particular embodiment of the invention, the reheating fluid at the inlet to the downstream heat exchanger 11 is in gaseous form, in a state close to its condensation temperature, for example at a pressure level of between 85 and 145 bar and a temperature of between 300 and 340° C. When the reheating fluid enters the downstream heat exchanger 11 in gaseous form, it transfers heat to the working fluid, and rapidly reaches its condensation temperature; at this point it is in the best condition to transfer heat, with a condensation heat transfer coefficient. At the outlet of the downstream heat exchanger 11, the reheating fluid has transferred sufficient heat to the working fluid to return to a liquid state.

In order to achieve the secondary pressure level, secondary circuit 9 may comprise one or more pumps 12. The use of dedicated pumps 12 enables the reheating fluid to be pressurized only in the sections required, in order to reduce the number of plant components that have to be compatible with high pressure. Alternatively, the source(s) supplying secondary circuit 9 can deliver high-pressure fluid.

Pump 12 is preferably fitted with a bypass 13 equipped with a non-return system. If pump 12 can no longer operate, secondary circuit 9 can continue to be supplied automatically, although at a pressure level different from the nominal pressure level of the secondary circuit.

After passing through the downstream heat exchanger 11, the reheating fluid, which has been reduced in temperature and/or pressure, leaves the reheating module 8 via a condensate circuit in the reheating module 21. It can then be sent to one or more of the following destinations: the initial stretch 3*c* of the main circuit, which corresponds to a preferred embodiment of the invention, where the reheating fluid is sent to the drum 6 located on the initial stretch 3*c*, and the reheating fluid is incorporated into the working fluid; the secondary circuit 9 at the upstream heat exchanger 10; the condensate and feedwater circuit 7, or an internal or external process. When the reheating fluid leaves the condensate circuit of the reheating module 21, it may "flash", i.e. partially evaporate, depending on the respective pressure and temperature levels of the condensate circuit of the reheating module 21 and the destination system. This flash phenomenon may require adapted installations, such as a flash tank, or the use of a boiler drum like the drum 6.

The secondary circuit 9 can be supplied with reheating fluid from one or more of the following sources: the condensate and feedwater circuit 7, the condensate circuit of the reheating module 21, an internal or external process with a fluid output at relevant conditions, or one or more elements located in the initial stretch 3*c* of the main circuit, such as an economizer 4, or a drum 6.

Preferably, the secondary circuit 9 is supplied with reheating fluid from at least two separate sources, each of which supplies a fluid with different temperature and/or pressure parameters. Secondary circuit 9 then comprises a mixing means 14 to which the different sources are connected. Alternatively, or in combination with this plurality of sources, secondary circuit 9 can feature a partial or total bypass of upstream heat exchanger 10. These features make it possible to regulate secondary circuit 9 by adapting the parameters of the incoming reheating fluid, for example, to changes in boiler load, changes in boiler fouling levels and other variations in boiler operating conditions such as fuel quality, or $O_2$ levels in the fumes. The plurality of sources and/or the bypass make it possible both to regulate the flow rate and temperature of the reheated working fluid and to ensure that the boiling point of the reheating fluid is not reached in the secondary circuit 9, in the case where the secondary circuit is designed to be entirely in liquid phase. To achieve this, the flow rates of the secondary circuit 9 supply sources and/or the bypass flow rate can be adjusted by one or more control valves 15 controlled by a control system 16. The control system 16 can determine the commands to be sent to the control valves 15 as a function of one or more measurements taken, for example, from:
- a first temperature sensor 17 on the second stretch 3b of the main circuit, downstream of the downstream heat exchanger 11,
- a pressure sensor 18, located in secondary circuit 9 downstream of any pump 12,
- a second temperature sensor 19, located in secondary circuit 9 between upstream heat exchanger 10 and downstream heat exchanger 11.

Full bypass of the upstream heat exchanger 10 allows part of the reheating fluid flow upstream of the upstream heat exchanger 10 to bypass all or part of the upstream heat exchanger 10 and to be sent directly to a section of secondary circuit 9 located downstream of the upstream heat exchanger 10. A partial bypass may be present when the upstream heat exchanger 10 comprises several sections in series, the partial bypass then enabling one or more sections of the upstream heat exchanger 10 to be bypassed without bypassing all the sections of the upstream heat exchanger 10.

In the embodiment shown in FIG. 1, secondary circuit 9 is supplied by a source at the outlet of an economizer 4, and a source connected to the condensate and feedwater circuit 7.

The plurality of sources with different pressure and/or temperature parameters makes it possible both to regulate the temperature of the reheated working fluid and to ensure that the boiling point of the reheating fluid is not reached in secondary circuit 9. If a single source is used to supply secondary circuit 9, it is not possible to control these two parameters independently. The system can then operate by prioritizing the parameters according to the situation.

The control valves 15 can be three-way valves, or simple two-way control valves. As shown in FIG. 1, for example, a three-way control valve 15 can be used to recover fluid from the main circuit, in this example between two economizers 4. In this example, the two-way control valve 15 can be used to regulate the temperature of the reheating fluid downstream of the upstream heat exchanger 10, depending on the pressure level of the secondary circuit 9, which can be measured, for example, downstream of a pump 12 or downstream of the upstream heat exchanger 10, to ensure that the boiling point of the reheating fluid is not reached in the secondary circuit 9. The three-way control valve 15 can regulate the temperature of the reheated working fluid, also as a function of the pressure level in secondary circuit 9.

One or more control valves 15 can be backed up by a bypass system, for example via one or more manual valves 20 or an automatic valve or control valve, to enable a degraded operating mode in the event of a problem with the control valve(s) 15.

The present invention also relates to a process for generating electricity or motive power in a thermal power plant, comprising the following steps:
- combustion of fuels and/or energy recovery, including waste, in at least one boiler 1,
- in said boiler 1, enthalpy rise of a working fluid in a main circuit, and enthalpy rise of a reheating fluid in the secondary circuit 9, from the energy contained in the combustion fumes and in the recovery fluid, the secondary circuit being at a higher pressure level than the main circuit, the difference in pressure level between the circuits being at least 10 bar,
- delivery of said working fluid to at least a first set of at least one turbine section 2a,
- sending said working fluid from said first set of at least one turbine section 2a to at least one downstream heat exchanger 11 of a reheating module 8, and sending said reheating fluid from the upstream heat exchanger (10) to said downstream heat exchanger 11,
- heat transfer from the reheating fluid to the working fluid in said downstream heat exchanger 11 of the reheating module 8,
- sending said working fluid from said downstream heat exchanger 11 to a second set of at least one turbine section 2b.

Various technical problems can result in the target reheating temperature of the working fluid downstream of the downstream heat exchanger 11 not being reached. For example, pump 12 or another pump may be unavailable, the downstream heat exchanger 11 may leak, or a control valve 15 may malfunction. In a conventional thermal power plant with a reheat cycle, failure to reach the target reheat temperature at this point may require part of the turbine to be shut down. The reason for this shutdown is the need to avoid degrading the last section of the second set of at least one turbine section 2b in the event of excessive condensation due to the absence of reheating. Stoppage of the last section of the assembly of at least one turbine section 2b may result in a stoppage of electricity production from part or all of the turbine. In the thermal power plant according to the invention, for example in the particular case of waste incineration and the preferred embodiment, the steam parameters of the main circuit and the pressure and temperature level of the secondary circuit make it possible to adjust the turbine exhaust vacuum setpoint, for example by means of regulation based on the temperature measurement of the working fluid leaving the reheating module 8, in order to avoid the excessive condensation levels mentioned above. It may therefore be possible, in a thermal power plant according to the invention, to avoid shutting down part or all of the turbine during a lack of reheating.

The present invention allows the reheating fluid in the secondary circuit 9 to be at a higher pressure level than the working fluid in the main circuit. As a result, most components in the boiler can be designed for a conventional pressure level corresponding to the main pressure level, e.g. economizers 4, drum 6, evaporator surfaces, evaporators, superheaters 5, and only a small part of the boiler exchange surface, in particular the upstream heat exchanger 10, needs to be designed for a high pressure level corresponding to the secondary pressure level, which significantly reduces investment costs compared with a high-pressure boiler. This also enables the temperature level of the boiler walls, and therefore of the refractories, to be kept at a conventional level, e.g. between 210 C and 290 C in the case of waste incineration.

The present invention is particularly well suited to waste-type fuel power plants. This type of plant does not usually include a reheater, as the corrosive fumes do not favor the use of reheaters located in the fumes. Some waste-fuel power plants have therefore been built with high-pressure boilers whose high-pressure steam (from the main circuit) feeds the reheaters. This type of plant is faced with higher investment costs (high pressure) and higher operating costs (more frequent unscheduled outages, higher maintenance costs).

Although the above description is based on particular embodiments, it is by no means limitative of the scope of the invention, and modifications may be made, in particular by substitution of technical equivalents or by different combination of all or some of the features developed above.

The invention claimed is:

1. A thermal power plant for producing electricity or motive power, comprising at least one fuel or heat recovery boiler, at least one turbine, at least one main circuit for circulating a working fluid, at least one drum located in the boiler on said main circuit, at least one reheating module and at least one secondary circuit in which a reheating fluid circulates, wherein:

said main circuit comprises at least one initial stretch located in said at least one boiler, at least one first stretch for sending working fluid from said at least one boiler to a first set of at least one turbine section, and a second stretch for sending working fluid from said first set of at least one turbine section to a second set of at least one turbine section, and said reheating module comprises at least one downstream heat exchanger located on the second stretch of the main circuit, wherein said secondary circuit comprises at least one upstream heat exchanger located in said boiler, wherein when the at least one boiler performs combustion of the at least one fuel and energy recovery to generate combustion fumes and recovery fluid, respectively, the upstream heat exchanger responds to a rise in enthalpy in the working fluid and a rise in enthalpy in the reheating fluid to transfer heat from the combustion fumes and the recovery fluid to the reheating fluid circulating in the secondary circuit, said reheating fluid circulating in said secondary circuit between the upstream and downstream heat exchangers, said plant being designed so that the reheating fluid can be, at the outlet of the upstream heat exchanger, at the nominal load point, at a pressure level at least ten bars higher than the pressure level at the nominal load point of the working fluid in said drum.

2. The thermal power plant according to claim 1, wherein the at least one fuel comprises waste such as household waste, waste from economic activities, hazardous waste, biomass, sewage sludge or medical waste.

3. The thermal power plant according to claim 1, wherein the upstream heat exchanger is a convective-type exchanger.

4. The thermal power plant according to claim 1, configured so that at least 90% of the mass of reheating fluid leaving the upstream heat exchanger is sent to the downstream heat exchanger.

5. The thermal power plant according to claim 1, wherein said secondary circuit comprises at least one pump configured to bring the pressure level of the reheating fluid, at the outlet of the upstream heat exchanger, to a level at least ten bars higher than the pressure level at the nominal charge point of the working fluid in said drum.

6. The thermal power plant according to claim 1, in which said secondary circuit is supplied with reheating fluid by at least two distinct sources, the pressure and/or temperature level of the two sources being different.

7. The thermal power plant according to claim 1, in which the secondary circuit comprises a partial or total bypass of the upstream heat exchanger.

8. The thermal power plant according to claim 6 further comprising:
a first temperature sensor on the second stretch of the main circuit, downstream of the downstream heat exchanger,
a pressure sensor, located on the secondary circuit,
a second temperature sensor, located in the secondary circuit between the upstream heat exchanger and the downstream heat exchanger, and
a control system connected to the first and second temperature and pressure sensors, and to at least one valve for controlling the flow rate of a source of the secondary circuit reheating fluid.

9. The thermal power plant according to claim 7 further comprising:
a first temperature sensor on the second stretch of the main circuit, downstream of the downstream heat exchanger,
a pressure sensor, located on the secondary circuit,
a second temperature sensor, located in the secondary circuit between the upstream heat exchanger and the downstream heat exchanger, and
a control system connected to the first and second temperature and pressure sensors, and to at least one valve for controlling the flow rate of the partial or total bypass of the upstream heat exchanger.

10. The thermal power plant according to claim 1 comprising at least one economizer located on the initial stretch of the main circuit, at least part of the reheating fluid supply to the secondary circuit coming from an outlet of said economizer and/or from a condensate and feedwater circuit.

11. The thermal power plant according to claim 1, comprising a drum located in the boiler and/or a condensate and feedwater circuit, said power plant being configured so that the reheating fluid can be sent, after the downstream heat exchanger, to said drum located in the boiler and/or to said condensate and feedwater circuit.

12. A method for generating electricity or motive power in a thermal power plant, comprising the following steps:
performing fuel combustion of at least one fuel and heat recovery in a boiler to generate combustion fumes and recovery fluid, respectively,
in said boiler, responsive to the combustion fumes and the recovery fumes, enthalpy of a working fluid rising in a main circuit, said main circuit comprising a drum, said working fluid being in said drum at a main pressure level, and enthalpy of a reheating fluid rising in a secondary circuit, said secondary circuit comprising at least one upstream heat exchanger located in the boiler, wherein the upstream heat exchanger responds to a rise in enthalpy in the working fluid and a rise in enthalpy in the reheating fluid to transfer heat from the combustion fumes and the recovery fluid to the reheating fluid circulating in the secondary circuit m heat exchanger, said secondary pressure level being at least ten bars higher than said main pressure level,
delivery of said working fluid to a first set of at least one turbine section,
sending said working fluid from said first set of at least one turbine section to at least one downstream heat exchanger of a reheater module, and sending said reheating fluid from the upstream heat exchanger to said downstream heat exchanger,
heat transfer from said reheating fluid to said working fluid in said downstream heat exchanger, and
sending said working fluid from said downstream heat exchanger to a second set of at least one turbine section.

13. A method for generating electricity or motive power in a thermal power plant according to claim 12, in which at least 90% of the reheating fluid mass leaving the upstream heat exchanger is sent to the downstream heat exchanger.

14. A method for generating electricity or motive power in a thermal power plant according to claim 12, in which the upstream heat exchanger is a convective-type exchanger.

15. A method for generating electricity or motive power in a thermal power plant according to claim 12, wherein the at least one fuel comprises waste such as household waste, waste from economic activities, hazardous waste, biomass, sewage sludge or medical waste, said primary pressure level being between 20 and 85 bar, and said secondary pressure level being greater than 70 bar.

16. A method for generating electricity or motive power in a thermal power plant according to claim 12, in which said reheating fluid circulating in said secondary circuit between said upstream heat exchanger and said downstream exchanger is in the liquid state.

* * * * *